United States Patent [19]

Shantzis

[11] Patent Number: 5,568,871
[45] Date of Patent: Oct. 29, 1996

[54] DOOR AND CHUTE FOR SEPARATED WASTE CONTROL

[76] Inventor: Mark D. Shantzis, 6061 Collins Ave., #6F, Miami Beach, Fla. 33147

[21] Appl. No.: 585,643

[22] Filed: Jan. 16, 1996

[51] Int. Cl.⁶ .................................................. B07C 7/04
[52] U.S. Cl. .................. 209/703; 209/706; 209/942; 209/930
[58] Field of Search .................................. 209/702, 703, 209/706, 942, 930

[56] References Cited

U.S. PATENT DOCUMENTS

| | | | |
|---|---|---|---|
| 3,658,242 | 4/1972 | Van De Pol | 232/44 |
| 4,640,403 | 2/1987 | McDermott | 193/34 |
| 5,031,829 | 7/1991 | Shantzis | 232/43.2 |
| 5,083,704 | 1/1992 | Rounthwaite | 209/702 X |
| 5,090,546 | 2/1992 | McDermott | 193/34 |
| 5,228,577 | 7/1993 | Wilson | 209/702 |
| 5,253,766 | 10/1993 | Sims | 209/702 |
| 5,257,577 | 11/1993 | Clark | 100/99 |
| 5,271,507 | 12/1993 | Evans, Jr. | 209/942 X |
| 5,492,227 | 2/1996 | Millette et al. | 209/703 |

FOREIGN PATENT DOCUMENTS

| | | | |
|---|---|---|---|
| 2691384-A1 | 11/1983 | France | 209/706 |
| 9201615 | 6/1992 | WIPO . | |

OTHER PUBLICATIONS

Acme Chute Co. Inc. 4 Page Brochure. (No Date).

*Primary Examiner*—D. Glenn Dayoan
*Attorney, Agent, or Firm*—Alvin S. Blum

[57] ABSTRACT

A modular chute assembly section has a tubular shape with an axial bore. When joined together, one atop the other, a multistory gravity conveyor chute is formed for deposit of waste through an access door at any floor that will fall to a basement receiver. In the basement, a receptacle mover has a number of different receptacles thereon, one for each type of separated waste. Controls at each access door enable the waste depositor to selectively move a waste receptacle beneath the chute to correspond to the type of waste being deposited. Controls for locking the access door, selecting a particular waste receptacle, sensing when the door is closed, and signalling apparatus for informing a depositor of system operating conditions are enclosed in a housing attached to the section adjacent the access door. Conduits and wiring for interconnecting the many housings are attached to the section so that the sections may be stacked up and the wiring simply plugged together to form the complete chute and control system with minimal on site construction requirements. This ensures safe and correct installation in regions with variable available skills.

26 Claims, 2 Drawing Sheets

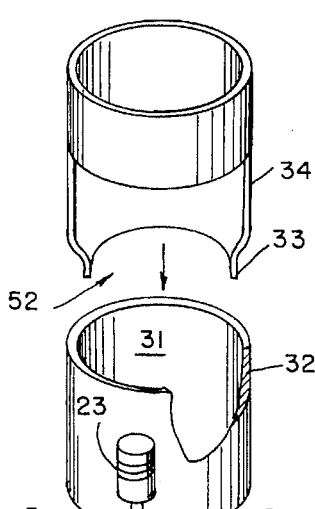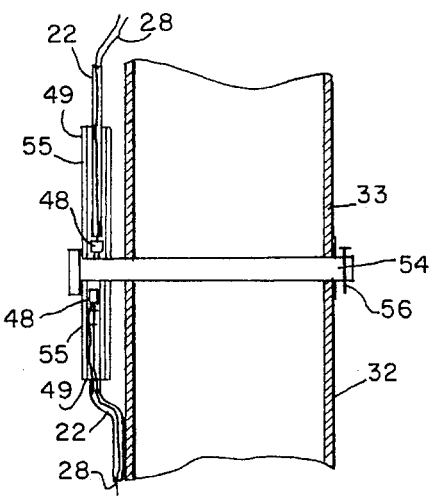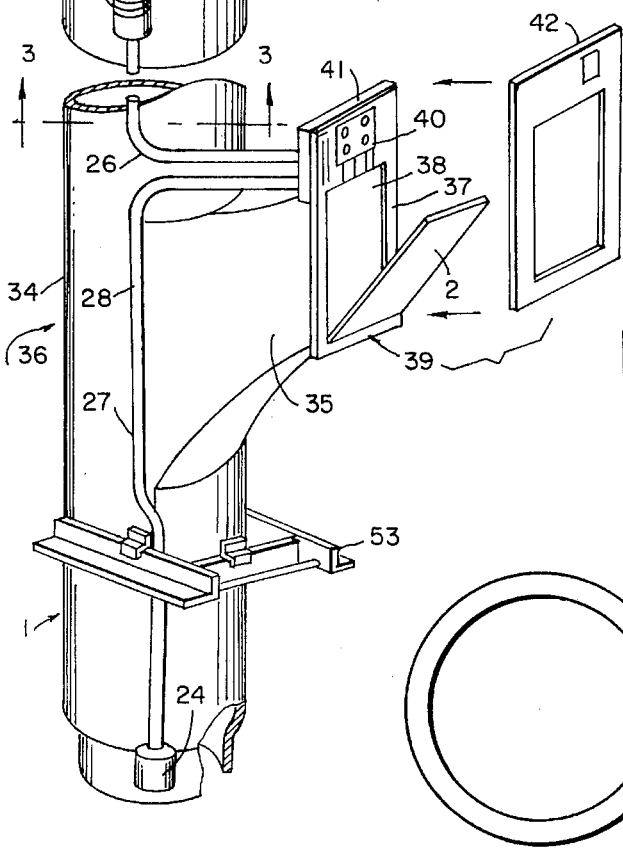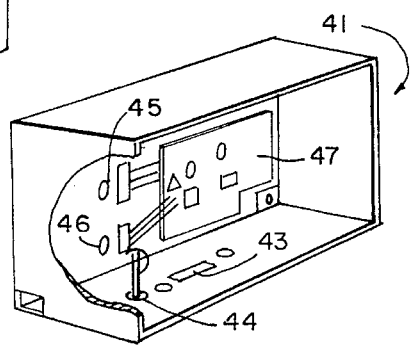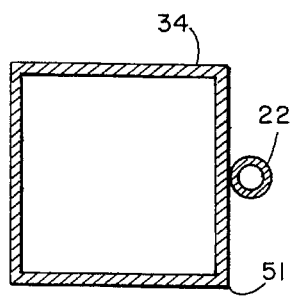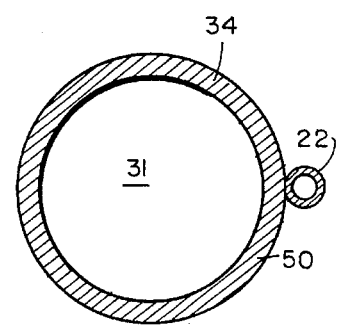

5,568,871

DOOR AND CHUTE FOR SEPARATED WASTE CONTROL

TECHNICAL FIELD

My invention relates to a tenant-controlled delivery of different categories of solid wastes into different containers for recycling that are selectively positioned beneath a single trash chute in a multi-story building, and, more particularly, to a chute and door therefor in which the controls are integral with the door frame and chute.

BACKGROUND ART

U.S. Pat. No. 5,031,829 issued Jul. 16, 1991 to the applicant discloses a system using a single chute in a multi-story building to collect into separate large receptacles different categories of wastes already separated by the tenant for recycling. A turntable carries a large receptacle for each category of waste. Control means on each floor enables a tenant to operate the turntable remotely to position a selected receptacle beneath the chute to receive a particular category of waste. A controller and interlocks on the chute access doors prevent conflicts between floors.

The control means of the prior art have been enclosed in a housing attached to the wall adjacent each chute door. A wiring conduit connects the housings on all of the floors and the basement where the remotely controlled turntable moves a selected container beneath the chute. Considerable expense is involved in hiring local labor to drill conduit holes between floors, wire the controls and fasten the housings in place. These installation processes require hiring separate categories of construction workers due to local employment rules. These workers, being unfamiliar with the special requirements of the apparatus, may make costly and time consuming errors in the installation. These errors may require considerable post installation effort from the manufacturer and reflect adversely on the reputation of the system. A new system such as this apparatus requires cooperation from all of the tenants using the system. If there are problems associated with inept installation, adverse first impressions of the tenants can lead to a prolonged lack of cooperation in use of the system.

DISCLOSURE OF THE INVENTION

It is accordingly an object of the invention to provide a system that incorporates the control means integral with the chute at each door, with the conduit already attached to the chute. The chute and door assembly for a floor is provided pre-wired in a segment arranged so that the segments may be joined together one atop the other and the wiring for each segment terminating in connectors that may be simply plugged together. The conduits for the wiring are also arranged to join together after the connectors are joined to protect the wiring. The chute with conduit is arranged to fit through a single hole between floors.

These and other objects, advantages and features of the invention will become more apparent when the detailed description is studied in conjunction with the drawings, in which like characters refer to like elements in the various figures.

BRIEF DESCRIPTION OF THE DRAWINGS

FIG. 2 is a perspective view of a section of the invention with portions broken away and the bezel displaced.

FIG. 3 is a sectional view, taken through line 3—3 of FIG. 2.

FIG. 4 is a perspective view of a housing of the invention.

FIG. 7 is a concrete pour ring form.

FIG. 8 is a sectional view of another embodiment of the invention.

FIG. 9 is a sectional view of a joint of another embodiment of the invention.

DETAILED DESCRIPTION OF PREFERRED EMBODIMENTS

Figure 1:
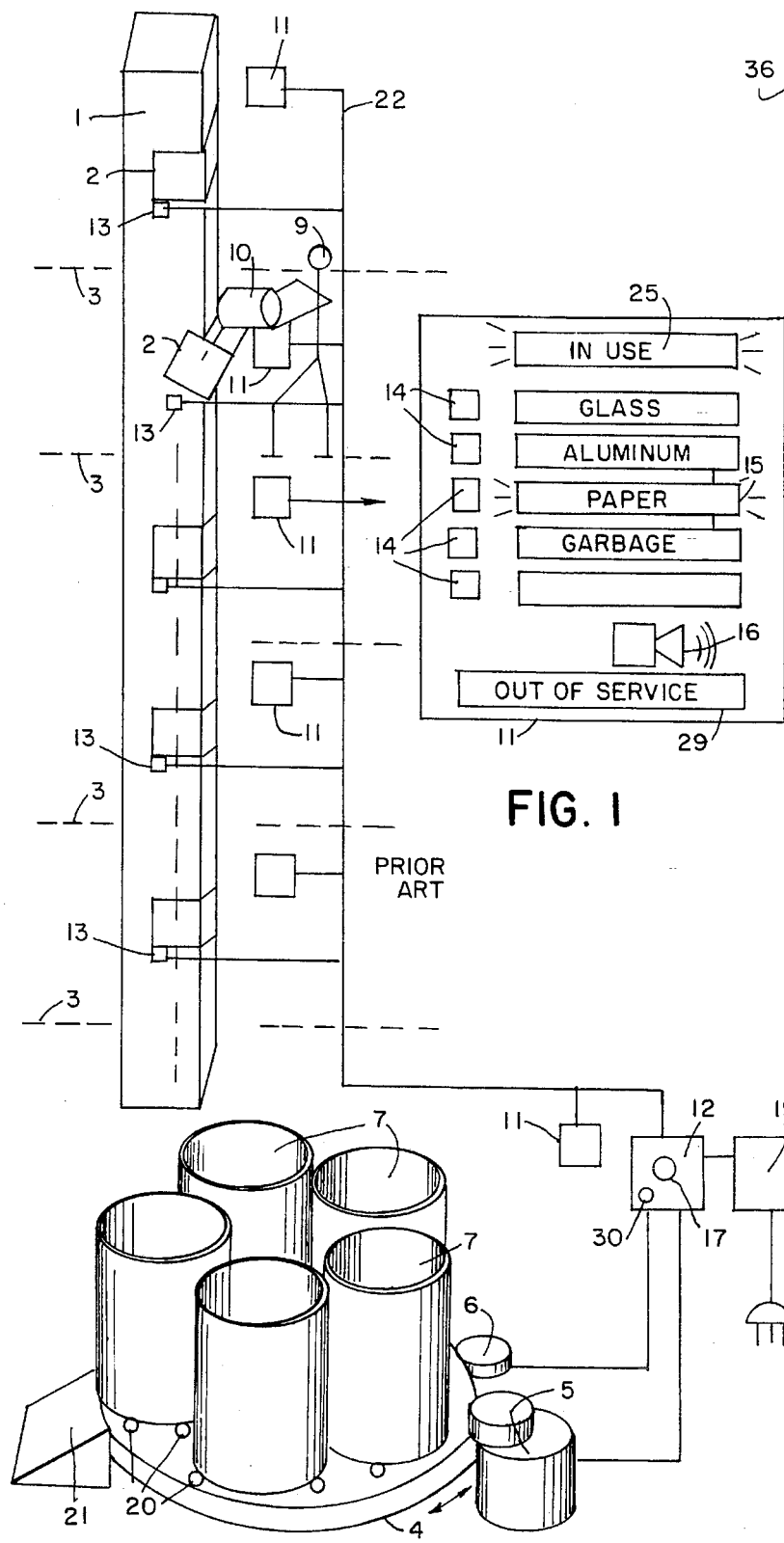
FIG. 1 is a perspective view, partially diagrammatic and not all to the same scale, of the system of the prior art with a turntable platform and one control panel greatly enlarged.

Referring now first to the system of the prior art shown in FIG. 1, a waste chute i has an access door 2 on each floor 3 of a multi-story building. These structures may be of the type well known in the art. To dispose of waste, a tenant 9 carries a container 10 of separated waste to the access door 2 on his floor. At control housing and panel 11 mounted on a wall adjacent door 2, he pushes pushbutton 14 to select a receptacle 7 in the basement to correspond to the type of waste he wishes to dispose (paper in this case). All the control panels are operatively connected to central control 12 by conduits. Beneath the chute 1, in the basement, a platform 4 holds a set of waste receptacles 7, one for each type of separated waste, such as clear glass, colored glass, aluminum, paper and all other wastes or garbage. The movable platform 4 is a turntable that is rotated by motor 5. A position sensor 6 senses the rotary position of the platform 4. The central control 12 operates the motor 5 that cooperates with the position sensor 6 in a servo relationship to rotate the platform 4 until the selected (paper) receptacle is directly beneath chute 7.

A door sensor and lock assembly 13 at each door 2 is also connected to the central control 12. While the platform is moving, the central control 12 actuates all the door locks to prevent waste falling while receptacles are moving. If any door is open, its door sensor will communicate that information to the central control 12 which may inhibit operation of motor 5 and platform motion.

when the selected receptacle is in position as determined by position sensor 6, the motor 5 stops, the lock at the door of the user opens and the selected item 15 on every control panel 11 lights up. A sonic indicator 16 sounds to notify that the system is ready to receive the selected waste. After a preselected time interval during which the door has remained closed, all the doors unlock so that another floor can use the system.

When any door is locked, all the other doors are locked and the "in use" light 25 on each panel is illuminated. A duplicate panel 11 in the basement facilitates service and indicates which door has been left open. In addition, a control switch 17 provides for disabling the controls on the floors while emptying the receptacles, which illuminates the "out of service" lights 29. A power supply 19 for the system is powered by the line power and the electronic controls in the central control 12 may be of the programmed microprocessor type with multiple inputs that is well known in the art.

It may indicate service problems and may telephone for service.

The receptacles 7 may be provided with wheels 20 for ease in rolling down ramp 21 when full.

Referring now to FIGS. 2–6, the invention comprises a plurality of modular chute assembly sections 36 having a tubular shape with a vertical axial bore 31 having a circular cross section 50. Affixed to the outside of the sidewall 34 is a conduit 22 for protectively carrying wires between floors and to the basement control. A support bracket 53 supports an individual section 36 on a floor (not shown). A radially outward distention of the sidewall forms a protuberance 35 provided with a vertical portal 38. The portal 38 is provided with a rigid frame assembly 37. A self closing door 2 is hingedly connected to a first edge 39 of the frame. A housing 41 is rigidly attached to the frame at another edge 40. Contained within the housing is a circuit board 47 and various signal lights 45, sonic signal 46, door lock 44, door condition sensor 43, and pushbutton controls 14 as desired. Wires 28 interconnect the electronics in the housing from one floor to other floors and the basement as desired. To provide the necessary protection to the wiring from trauma and fire, the interconnecting wires pass through upper conduit portion 26 and lower conduit portion 27. These wires terminate in plug together connectors. The connectors 48 are contained within terminal receptacles 55. These receptacles slide along the conduit and can be locked in place on the conduit with locking collar 49.

When being transported as individual sections 36, the connector is protectively within its receptacle and the receptacle is locked on the conduit protectively so that it does not protrude beyond the end 32 or 33 of the tubular sidewall. When the sections are installed and joined together, then the wires of each section are plugged together with connectors 48, the receptacles are unlocked and sidingly joined together and then locked onto their conduits to provide electrically secure conduit continuity. The tubular sections may join together in a nesting or telescoping joint 52 in which a downstream end 33 has a reduced diameter that slides into an enlarged upstream end 32. A unitary bezel 42 bolts onto the frame assembly 37 and covers the housing and frame with a finished appearance and apertures for the necessary indicator lights and control buttons or switches.

When a poured concrete floor supports the chute section 36, a form ring 18 may be provided to furnish an aperture configured to pass the sidewall and also the attached conduit.

The tubular section may have a variety of cross sectional shape s. FIG. 8 shows a rectangular tubular sidewall.

FIG. 9 shows a flange joint 54 between an upstream end 32 and a downstream end 33 of two sections. The conduits 22 terminate in sliding receptacles 55 which lock onto the conduits with locking means 49. The flange joint is secured with flange bolts 56.

Figure 10:
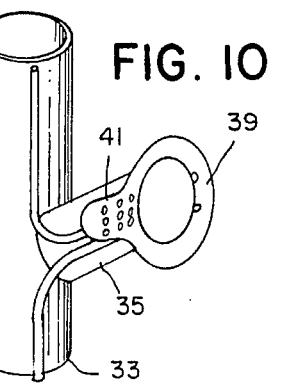
FIG. 10 is a perspective view of another embodiment of the invention.
Figure 6:
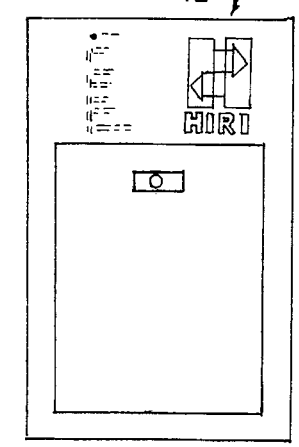
FIG. 6 is a front elevation view of a bezel of the invention.
Figure 5:
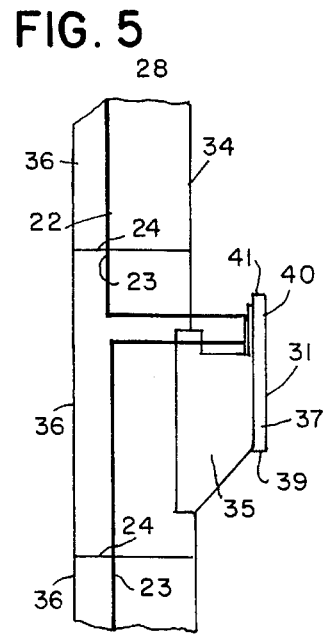
FIG. 5 is a side elevation view of portion of a chute of the invention.

FIG. 10 shows an embodiment of the invention in which the door 2 opens from one side 39 and the housing 41 is mounted on the opposite side. The section 36 has a protuberance 35 which terminates in a circular opening with a circular door 2.

The above disclosed invention has a number of particular features which should preferably be employed in combination although each is useful separately without departure from the scope of the invention. While t have shown and described the preferred embodiments of my invention, it will be understood that the invention may be embodied otherwise than as herein Specifically illustrated or described, and that certain changes in the form and arrangement of parts and the specific manner of practicing the invention may be made within the underlying idea or principles of the invention within the scope of the appended claims.

I claim:
1. In a system for selective, separated collection of waste in a plurality of waste collection receptacles in a building having a plurality of floors having a chute with access door at each floor from which waste is to be collected, a receptacle mover for moving a selected one of a plurality of receptacles beneath the chute to receive a particular category of waste deposited through an access door, remote door lock means connected to each door to controllably prevent access to the chute, door sensing means for determining when a door is closed, waste category selection means at each access door for selecting a category of waste to be received by a receptacle, and means for controlling the receptacle mover to move a receptacle beneath the chute suitable for a selected waste category while locking access door as required, the improvement comprising:
  a modular chute assembly section which can be joined with other sections to form a multistory gravity conveyor chute for wastes the section comprising:
    A) a sidewall having basically a tubular shape with a vertical axial bore which guides waste items falling through the bore thereof, said section having an upstream end opening for venting and for receiving items dropped into said section from above, a downstream end opening for discharging items passing through the bore, at least one of the ends being selectively engagable with an adjacent section on another floor to form a conveyor chute longer than a single section;
    B) a radially outward distention of the sidewall at a position intermediate the upstream and downstream ends forming a protuberance, the protuberance provided with a substantially vertical portal through which items can be dropped into the bore of the section, the portal provided with a rigid frame assembly having a first edge and other edges;
    C) a self-closing access door pivotally attached to said first edge; and
    D) a housing attached to an edge other than said first edge, said housing provided with:
      i) an electrically powered door lock means for selectively preventing access to the portal;
      ii) waste category selection means for selectively controlling a category of waste to be received;
      and iii) signal means for conveying operating condition information.

2. The modular chute assembly section according to claim 1, in which said housing is further provided with door position signalling means for signalling when the door is open or closed.

3. The modular chute assembly section according to claim 2, further comprising elongate electrical conduit means for containing electric wiring, the conduit means connected to said housing and extending from said housing to both of the ends at a top conduit termination and a bottom conduit termination, the conduit means being affixed along the length thereof to the section so as to enable the conduit to be transported and installed in combination with the section.

4. The modular chute assembly section according to claim 3, further comprising wiring operatively connected to said housing and extending through said conduit means to the top conduit termination and bottom conduit termination, the wiring terminating in connectors at both of the terminations so as to provide a prewired section that can be joined to other sections by simply plugging connectors together.

5. The modular chute assembly section according to claim 4, in which the conduit terminations are provided with means for joining adjacent terminations together to provide for complete rigid enclosure of the wiring between adjacent sections.

6. The modular chute assembly section according to claim 5, in which the tubular shape is substantially circular in cross section.

7. The modular chute assembly section according to claim 5, in which the tubular shape is substantially rectangular in cross section.

8. The modular chute assembly section according to claim 1, further comprising elongate electrical conduit means for containing electric wiring, the conduit means connected to said housing and extending from said housing to both of the ends at a top conduit termination and a bottom conduit termination, the conduit means being affixed along the length thereof to the section so as to enable the conduit to be transported and installed in combination with the section.

9. The modular chute assembly section according to claim 8, further comprising wiring operatively connected to said housing and extending through said conduit means to the top conduit termination and bottom conduit termination, the wiring terminating in connectors at both of the terminations so as to provide a prewired section that can be joined to other sections by simply plugging connectors together.

10. The modular chute assembly section according to claim 9, in which the conduit terminations are provided with means for joining adjacent terminations together to provide for complete rigid enclosure of the wiring between adjacent sections.

11. The modular chute assembly section according to claim 10, in which the tubular shape is substantially circular in cross section.

12. The modular chute assembly section according to claim 10, in which the tubular shape is substantially rectangular in cross section.

13. In a system for selective, separated collection of waste in a plurality of waste collection receptacles in a building having a plurality of floors having a chute with access door at each floor from which waste is to be collected, a receptacle mover for moving a selected one of a plurality of receptacles, beneath the chute to receive a particular category of waste deposited through an access door, door sensing means for determining when a door is closed, waste category selection means at each access door for selecting a category of waste to be received by a receptacle, and means for controlling the receptacle mover to move a receptacle beneath the chute suitable for a selected waste category, the improvement comprising:

a modular chute assembly section which can be joined with other sections to form a multistory gravity conveyor chute for waste, the section comprising:

A) a sidewall having basically a tubular shape with a vertical axial bore which guides waste items falling through the bore thereof, said section having an upstream end opening for venting and for receiving items dropped into said section from above, a downstream end opening for discharging items passing through the bore, at least one of the ends being selectively engagable with an adjacent section on another floor to form a conveyor chute longer than a single section;

B) a radially outward distention of the sidewall at a position intermediate the upstream and downstream ends forming a protuberance, the protuberance provided with a substantially vertical portal through which items can be dropped into the bore of the section, the portal provided with a rigid frame assembly;

C) a self-closing access door pivotally attached to said rigid frame assembly; and D) a housing attached to said rigid frame assembly, said housing provided with:

i) waste category selection means for selectively controlling a category of waste to be received;
    and ii) signal means for conveying operating condition information.

14. The modular chute assembly section according to claim 13, in which said housing is further provided with door position signalling means for signalling when the door is open or closed.

15. The modular chute assembly section according to claim 14, further comprising elongate electrical conduit means for containing electric wiring, the conduit means connected to said housing and extending from said housing to both of the ends at a top conduit termination and a bottom conduit termination, the conduit means being affixed along the length thereof to the section so as to enable the conduit to be transported and installed in combination with the section.

16. The modular chute assembly section according to claim 15, further comprising wiring operatively connected to said housing and extending through said conduit means to the top conduit termination and bottom conduit termination, the wiring terminating in connectors at both of the terminations so as to provide a prewired section that can be joined to other sections by simply plugging connectors together.

17. The modular chute assembly section according to claim 16, in which the conduit terminations are provided with means for joining adjacent terminations together to provide for complete rigid enclosure of the wiring between adjacent sections.

18. The modular chute assembly section according to claim 17, in which the tubular shape is substantially circular in cross section.

19. The modular chute assembly section according to claim 17, in which the tubular shape is substantially rectangular in cross section.

20. The modular chute assembly section according to claim 13, further comprising elongate electrical conduit means for containing electric wiring, the conduit means connected to said housing and extending from said housing to both of the ends at a top conduit termination and a bottom conduit termination, the conduit means being affixed along the length thereof to the section so as to enable the conduit to be transported and installed in combination with the section.

21. The modular chute assembly section according to claim 20, further comprising wiring operatively connected to said housing and extending through said conduit means to the top conduit termination and bottom conduit termination, the wiring terminating in connectors at both of the terminations so as to provide a prewired section that can be joined to other sections by simply plugging connectors together.

22. The modular chute assembly section according to claim 21, in which the conduit terminations are provided with means for joining adjacent terminations together to provide for complete rigid enclosure of the wiring between adjacent sections.

23. The modular chute assembly section according to claim 22, in which the tubular shape is substantially rectangular in cross section.

24. The modular chute assembly section according to claim 22, in which the tubular shape is substantially rectangular in cross section.

25. The modular chute assembly section according to claim 1, further comprising a unitary bezel covering both said frame assembly and said housing.

26. The modular chute assembly section according to claim 13, further comprising a unitary bezel covering both said frame assembly and said housing.

* * * * *